(12) United States Patent
Huys et al.

(10) Patent No.: US 9,291,998 B2
(45) Date of Patent: Mar. 22, 2016

(54) DEVICE AND METHOD FOR HOLOGRAPHIC REFLECTION IMAGING

(71) Applicant: IMEC, Leuven (BE)

(72) Inventors: Roeland Huys, Wilsele (BE); Richard Stahl, Rotselaar (BE); Geert Vanmeerbeeck, Keerbergen (BE); Peter Peumans, Herfelingen (BE)

(73) Assignee: IMEC, Leuven (BE)

( * ) Notice: Subject to any disclaimer, the term of this patent is extended or adjusted under 35 U.S.C. 154(b) by 140 days.

(21) Appl. No.: 13/869,303

(22) Filed: Apr. 24, 2013

(65) Prior Publication Data

US 2013/0278981 A1     Oct. 24, 2013

(30) Foreign Application Priority Data

Apr. 24, 2012   (EP) ..................................... 12165341

(51) Int. Cl.
| | | |
|---|---|---|
| *G03H 1/10* | (2006.01) | |
| *G02B 5/32* | (2006.01) | |
| *G03H 1/04* | (2006.01) | |
| *G03H 1/00* | (2006.01) | |
| *G03H 1/02* | (2006.01) | |

(52) U.S. Cl.
CPC ............ *G03H 1/0402* (2013.01); *G03H 1/0443* (2013.01); *G03H 1/0465* (2013.01); *G03H 2001/005* (2013.01); *G03H 2001/0212* (2013.01); *G03H 2001/0447* (2013.01); *G03H 2226/11* (2013.01)

(58) Field of Classification Search
None
See application file for complete search history.

(56) References Cited

U.S. PATENT DOCUMENTS

| | | | |
|---|---|---|---|
| 2010/0060962 A1* | 3/2010 | Rosen .............................. | 359/29 |
| 2013/0093871 A1* | 4/2013 | Nowatzyk et al. .............. | 348/79 |

FOREIGN PATENT DOCUMENTS

WO     WO2011/049965 A1     4/2011

OTHER PUBLICATIONS

European Search Report, European Patent Application No. 12165341.4 dated Sep. 28, 2012.
Lee, Myungjun et al., "Field-Portable Reflection and Transmission Microscopy Based on Lensless Holography", Biomedical Optics Express, vol. 2, No. 9, Sep. 1, 2011, pp. 2721-2730.
Seo, Sungkyu et al., "Lensfree Holographic Imaging for On-Chip Cytometry and Diagnostics", Lab Chip, vol. 9, 2009, pp. 777-787.

* cited by examiner

*Primary Examiner* — Jade R Chwasz
(74) *Attorney, Agent, or Firm* — McDonnell Boehnen Hulbert & Berghoff LLP (57) ABSTRACT

Methods and devices for holographic imaging are disclosed. In some embodiments, a holographic imaging device is disclosed that includes at least one radiation source, a reflective surface, and an image sensor. The at least one radiation source may be configured to emit a radiation wave towards the reflective surface and an object positioned on or near the reflective surface, where the radiation wave is reflected by the reflective surface to produce a reference wave and is reflected directly toward the image sensor by the object to produce an object wave directed at the image sensor. Further, the image sensor may be configured to determine an interference pattern between the reference wave and the object wave. A holographic image representing the object may be reconstructed based on the interference pattern.

19 Claims, 4 Drawing Sheets

DEVICE AND METHOD FOR HOLOGRAPHIC REFLECTION IMAGING

CROSS-REFERENCE TO RELATED APPLICATIONS

This application claims priority to European Patent Application Serial No. EP12165341.4 filed Apr. 24, 2012, the contents of which are hereby incorporated by reference.

BACKGROUND

Holography was invented over sixty years ago by the physicist Dennis Gabor and is a technique that allows the light scattered from an object to be recorded and later reconstructed. Digital holography uses digital reconstruction of the diffraction patterns.

In digital holographic microscopy, a diffraction pattern, obtained by interference between a reference wave and an object wave that has interacted with an object of interest, may be detected and stored in a digital recording. By applying a reconstruction algorithm to the recorded diffraction pattern, an image or image signature of the object of interest may be obtained. Coherent or partially coherent light, collimated by a small aperture, may be used to illuminate an object in order to produce a diffraction pattern. This diffraction pattern may then be acquired by a high resolution optoelectronic sensor array. Such a lens-free holographic microscopy setup may produce a hologram of the object with phase information encoded in the diffraction images. Lens-free holographic imaging can provide an attractive low-cost solution for imaging small objects, such as, for example, microscopic objects (e.g., biological cells), because no expensive or complex optical components, such as high-quality optical lenses, are required.

Typical methods for holographic imaging in biological applications may be primarily based on in-line transmission geometry, in which coherent light from a light source illuminates a sample, which may be positioned on a glass substrate, and the diffraction or fringe pattern is recorded on an imager positioned on the opposite side of the sample with respect to the light source.

Figure 1:
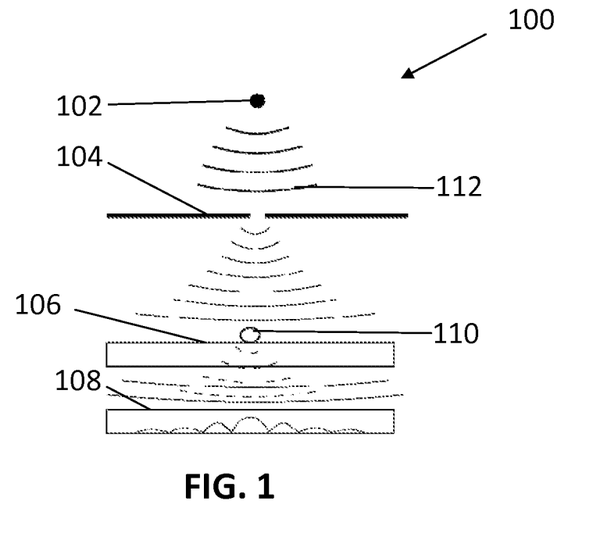
FIG. 1 illustrates a typical device for reconstructing holographic images of a transparent object.

FIG. 1 illustrates an example typical holography setup for reconstructing a holographic image representing a transparent object. As shown, the setup 100 comprises a light source 102, an aperture 104, and a transparent surface 106, and an image sensor 108. The aperture 104 may be, for example, a pinhole. Other apertures are possible as well. The transparent surface 106 may be, for example, a glass substrate. Other transparent surfaces are possible as well.

As shown, the transparent surface 106 supports an object 110. The aperture 104 may collimate a light wave 112 emanating from the light source 102 to produce a substantially planar parallel coherent or partially coherent light wave near the object 110 after propagating unimpeded over a suitable distance between the aperture 104 and the object 110. The light wave may then interact with the object 110 (e.g., may undergo a phase shift due to changes in refractive index while passing through the object 110). A diffraction pattern formed by interference of an object wave component, which has interacted with the object 110, and a reference wave component, which has passed through the transparent surface 106 without interacting with the object 110, may then be recorded by the image sensor 108.

Seo et al. disclose a lens-free holographic cytometer. See Seo et al., *Lab on a Chip*, Vol. 9, Issue 6, pages 777-787 (2009). In particular, Seo et al. describe an imaging and reconstruction method and system that may allow for improved reconstructed images by providing rich texture information. The disclosed system may furthermore be used for characterization and counting of cells positioned on a complementary metal-oxide-semiconductor (CMOS) imaging chip. Seo et al. thus demonstrate that identification and/or characterization of a heterogeneous cell solution on a chip is feasible based on pattern recognition of the holographic diffraction pattern of each cell type.

However, holographic imaging using in-line transmission geometry may not be suitable for imaging non-transparent samples. Furthermore, dense or connected objects, such as biological tissue samples, may prevent the undistorted transmission of a suitable fraction of the wave through the sample in order to form a reference wave component. Therefore, when imaging such a non-transparent or dense sample, a suitable object wave component may desirably be obtained by reflection on the surface of the sample, instead of transmission through the sample.

Figure 2:
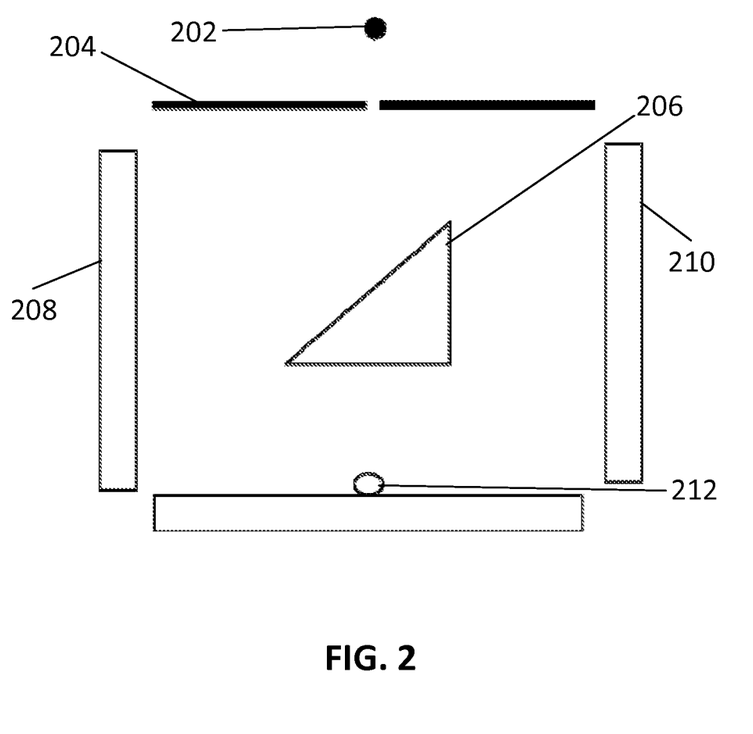
FIG. 2 illustrates a typical device for reconstructing holographic images of a non-transparent object.

When a high resolution is desired for small objects, the reflective-mode setup may become complicated. For example, FIG. 2 illustrates the working principles of a field portable reflection/transmission microscope based on lens-less holography, as described by Lee et al. See Lee et al., *Biomedical Optics Express*, Volume 2, Issue 9, pp. 2721-2730 (2011). As shown, the setup 200 is similar to that of a Michelson interferometer, and comprises a light source 202, an aperture 204, a beam-splitting device 206, a reflective surface 208, and an image sensor 210. The image sensor 210 may be, for example, a CMOS sensor chip. Other image sensors are possible as well.

The setup 200 may function as a lens-less reflection-mode microscope based on digital off-axis holography in which the beam-splitting device 206 and the reflective surface 208 are used to produce a tilted reference wave for producing an interference pattern by superposition on the reflected light from an object 212. Therefore, an off-axis hologram of the object 212 is created on the image sensor 210. The beam-splitting device 206 is an essential feature of the setup 200 for the interference of the reflected beam with the reflected light from an object to reconstruct the hologram.

SUMMARY

Disclosed are devices and methods for reconstructing holographic images. The disclosed devices and methods may allow for digital holographic microscopy and, in particular, for observation and analysis of biological cells. The disclosed devices and methods may further allow for holographic imaging of non-transparent (e.g., reflective) materials, and holographic imaging of objects at close-range. Other applications of the disclosed devices and methods are possible as well.

In a first aspect, a holographic imaging device may comprise at least one radiation source, a reflective surface, and an image sensor. In these embodiments, the at least one radiation source is configured to emit a radiation wave towards the reflective surface and an object positioned on or near the reflective surface, where the radiation wave is reflected by the reflective surface to produce a reference wave and is reflected directly toward the image sensor by the object to produce an object wave directed at the image sensor. Further, in these embodiments, the image sensor is configured to determine an interference pattern between the reference wave and the object wave.

In some embodiments, the reflective surface is substantially parallel to the image sensor. In some embodiments, the radiation wave being reflected directly toward the image sensor by the object comprises the radiation wave being reflected directly toward the image sensor by the object without the use of intermediate optical devices.

In some embodiments, the at least one radiation source is positioned between the reflective surface and the image sensor. In other embodiments, the at least one radiation source is positioned on the image sensor. In still other embodiments, the image sensor comprises at least one aperture. The at least one radiation source may be located within the at least one aperture. Further, the aperture is holographically coupled to the at least one radiation source and configured to impart spatial coherence to the radiation wave.

In some embodiments, the holographic imaging source further comprises a valve configured to open and close the at least one aperture.

In some embodiments, the at least one radiation source comprises a microelectromechanical system device.

In some embodiments, the at least one radiation source comprises at least one of an optical waveguide, a light-emitting diode, and a laser.

In some embodiments, the at least one radiation source comprises a plurality of radiation sources. In these embodiments, each radiation source in the plurality of radiation sources may be configured to emit radiation of a different wavelength.

In some embodiments, the holographic imaging device may further comprise an actuator configured to move the image sensor relative to at least one of the object and the at least one radiation source.

In some embodiments, the holographic imaging device further comprises or is communicatively coupled to at least one processor configured to, based on the interference pattern, reconstruct a holographic image representing the object.

In a second aspect, a method is disclosed that includes providing a holographic imaging device comprising at least one radiation source, a reflective surface, and an image sensor. The method further includes the at least one radiation source emitting a radiation wave towards the reflective surface, where the radiation wave is (i) reflected by the reflective surface to produce a reference wave and (ii) reflected by an object in the holographic imaging device directly toward the image sensor to produce an object wave directed at the image sensor. The method further includes determining an interference pattern between the reference wave and the object wave.

In some embodiments, the method further includes, based on the interference pattern, reconstructing a holographic image representing the image.

In a third aspect, a method is disclosed that includes providing a holographic imaging device comprising at least one radiation source, a reflective surface, and an image sensor. The method further includes the at least one radiation source emitting a first radiation wave, where the first radiation wave is (i) reflected by the reflective surface to produce a first reference wave and (ii) reflected by an object in the holographic imaging device directly toward the image sensor to produce a first object wave directed at the image sensor. The method still further includes the at least one radiation source emitting a second radiation wave, where the second radiation wave is (i) reflected by the reflective surface to produce a second reference wave and (ii) reflected by an object in the holographic imaging device directly toward the image sensor to produce a second object wave directed at the image sensor. The method further includes determining a first interference pattern between the first radiation wave and the first object wave and determining a second interference pattern between the second reference wave and the second object wave. The method further includes, based on the first interference pattern and the second interference pattern, reconstructing a holographic image representing the object.

In some embodiments, the first radiation wave has a first wavelength and the second radiation wave has a second wavelength different than the first wavelength.

In some embodiments, the method may further comprise, prior to the at least one radiation source emitting the second radiation wave, at least one of (i) a valve closing an aperture on the image sensor and (ii) an actuator moving the image sensor relative to the object and the at least one radiation source.

Particular aspects and embodiments of the disclosed methods and devices are set out in the accompanying independent and dependent claims. Features from the dependent claims may be combined with features of the independent claims and with features of other dependent claims as appropriate and not merely as explicitly set out in the claims.

These and other aspects will be apparent from and elucidated with reference to the embodiments described hereinafter.

The drawings are merely schematic and are not intended to be limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Disclosed are example devices and methods for reconstructing holographic images representing objects. The devices may take the form of, for example, holographic imaging devices. The disclosed holographic imaging devices allow for directing a radiation wave reflected by an object towards an image sensor without the use of supplementary optical elements. By eliminating supplementary optical elements from the holographic imaging devices, more compact holographic imaging devices may be achieved.

In order to allow for the direction of a radiation wave towards an image sensor without the use of supplementary optical elements, an example holographic imaging device may include a reflective surface positioned substantially parallel to the image sensor. An object may be positioned on or near the reflective surface and imaged. In embodiments where the imaging of the object takes place from a first side of the holographic imaging device, other functions (e.g., impedance measurements) may take place simultaneously or at another time from a second side of the holographic imaging device different than the first. The disclosed holographic imaging devices may be used to image transparent and/or non-transparent objects.

Figure 3:
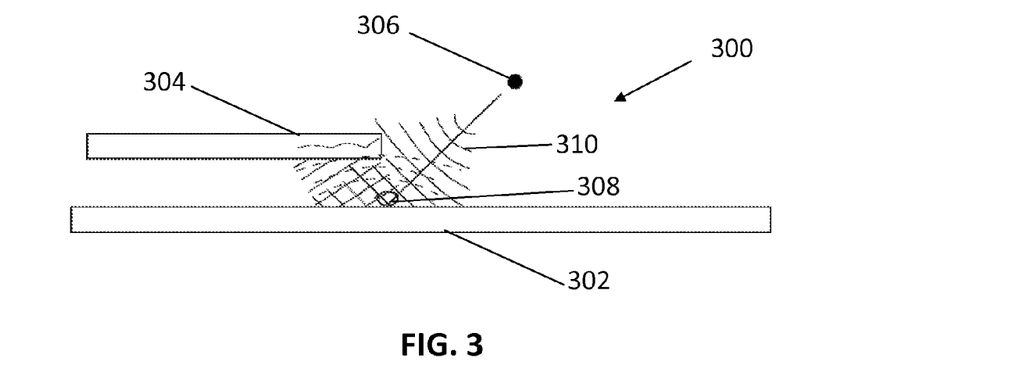
FIG. 3 is a schematic of an example holographic imaging device, in accordance with some embodiments.

FIG. 3 is a schematic of an example holographic imaging device 300, in accordance with some embodiments. As shown, the holographic imaging device 300 includes a reflective surface 302, an image sensor 304, and at least one radiation source 306. The holographic imaging device 300 may be used to reconstruct a holographic image representing an object 308, as shown. The object 308 may comprise one or more connected or disconnected, independent or interrelated material entities, and may be of a biological or non-biological nature. The object 308 may be transparent or non-transparent. The object 308 may have different refractive index properties than its surrounding medium (which may, for example, comprise air or a solvent fluid) so as to, for example, at least partially reflect light incident thereupon. In some embodiments, the object 308 may comprise particles, cells, or other samples of a biological nature. Alternatively, the object 308 may comprise an electronic structure, such as a structure mounted or processed on a chip (e.g., a microelectromechanical system (MEMS) structure, such as an MEMS cantilever or micro-mechanical device), or other non-biological sample. The object 308 may take other forms as well.

The at least one radiation source 306 may be configured to provide at least partially coherent radiation. For example, the at least one radiation source 306 may be configured to emit a radiation wave 310 having spatial and temporal coherence sufficient for obtaining interference patterns. In some embodiments, a coherence area of the radiation wave 310 in a plane perpendicular to the direction of wave propagation and intersecting with the object 308 may be at least of similar dimensions as the object 308 to be imaged, and may be a multiple thereof (e.g., a factor 10 larger, or a factor 100 larger). The radiation wave 310 may have other coherence areas as well.

Further, in some embodiments, a coherence time of the radiation wave 310 propagating from the radiation source 306 may be at least sufficient to allow interference fringes to form over phase differences corresponding to the optical path length differences between waves reflecting off the object 308 and reflecting off the reflective surface 302 near the object 308. The radiation wave 310 may have other coherence times as well.

In some embodiments, the radiation wave 310 may comprise, for example, coherent or partially coherent monochromatic visible light or a coherent or partially coherent narrow-bandwidth visible light (e.g., a light emitting diode (LED) or a light amplification by stimulated emission of radiation device (LASER)). Other radiation waves 310 are possible as well. Alternatively, the radiation wave 310 may comprise coherent or partially coherent invisible light, such as electromagnetic light, infrared light, microwaves, or ultraviolet light. Still alternatively, the radiation wave 310 may comprises other radiation qualities, such as coherent electron waves (e.g., as used in electron microscopes) or coherent X-ray waves. The radiation wave 310 may take other forms as well.

The at least one radiation source 306 may be configured to actively generate and emit a specific radiation quality and/or may be configured to passively supply and direct the specific radiation quality (e.g., may be configured as an optical waveguide). The at least one radiation source 306 may further comprise a two or more interrelated or independent radiation sources, such as, for example, two or more light sources configured to emit radiation waves of different wavelengths.

The reflective surface 302 may be configured to reflect the radiation wave 310 emitted by the at least one radiation source 306. To this end, the reflective surface 302 may comprise, for example, a mirror (e.g., a polished front-surface mirror). In embodiments where the radiation wave comprises visible light, the mirror may comprise a conductive layer (e.g., of hold) arranged on top of a substrate carrier (e.g., a glass support substrate). Alternatively, in embodiments where the radiation wave 310 comprises other radiative qualities, the reflective surface 302 may comprise a surface of a non-transparent substrate (e.g., a semiconductor material, such as a silicon-based chip). Alternatively or additionally, the reflective surface 302 may be a surface of a substrate configured to scatter incident light if used in transmission mode, such as a wall of a microfluidic channel, or may be a surface of a substrate that is not accessible from a side of the substrate opposite the reflective surface 302 due to design considerations (e.g., when a base layer or structure supports the substrate). Further, in some embodiments, the reflective surface 103 may comprise a concave surface configured to cope with spherical wavefronts received from the radiation source 306 so as to obtain a substantially planar wavefront reflection. In other embodiments, non-planar wavefronts may be dealt with in software. In general, the reflective surface 302 may be configured to deal with non-planar wavefronts so as to allow for a reduced distance between the image sensor 304 and the reflective surface 302. Still further, in some embodiments, the reflective surface 302 may be part of a micro-fluidic channel containing the object 308. In particular, the object 308 may be transported in the micro-fluidic channel, such that the object 308 may be illuminated and imaged while travelling past the at least one radiation source 306 and image sensor 304. The reflective surface 302 may take other forms as well.

The image sensor 304 may comprise a multispectral or hyperspectral image sensor. Other image sensors are possible as well. In some embodiments, the image sensor 304 may comprise a plurality of pixel elements (e.g., radiation sensor elements), which may be arranged in an array (e.g., a grid). For example, the image sensor 304 may comprise a charge-coupled device or CMOS image sensor. Other image sensors are possible as well. In some embodiments, the image sensor 304 may be configured to provide a digital representation of the distribution of a radiative quantity received over an imaging plane of the image sensor 304.

As shown, the image sensor 304 and the reflective surface 302 may be substantially parallel to one another. In some embodiments, a distance between the image sensor 304 and the reflective surface 302 may be small (e.g., less than 1 mm, less than 500 µm, less than 100 µm, or 50 µm). Other distances between the image sensor 304 and the reflective surface 302 are possible as well.

Further, while the radiation source 306 is shown not to be between the image sensor 306 and the reflective surface 304, in some embodiments, the radiation source 306 may be between the image sensor 306 and the reflective surface 304. In these embodiments, the radiation source 306 may emit the radiation wave 310 towards the reflective surface 302 and the object 308 may be positioned in between an imaging place of the image sensor 304 and a plane in which the reflective surface 302 lies (e.g., on or near the reflective surface 302).

In order to reconstruct a holographic image representing the object 308, the at least one radiation source 306 may emit the radiation wave 310 towards the reflective surface 302 and the object 308. To this end, the object 308 may be positioned on the reflective surface 302, as shown, and the at least one radiation source 306 may illuminate the reflective surface 302 and the object 308, such that the object 308 is located in the cone of the radiation wave 310. A wavelength of the radiation wave 310 may be selected based on dimensions of the object 308. In particular, the wavelength may be selected such that dimensions of the object 308 are larger than approximately half the wavelength. The object 308 may have dimensions on the order of micrometers or nanometers (e.g., less that 500 µm, less than 50 µm, less than 5 µm, or even less than 500 nm). Other wavelengths of the radiation wave 310 and other dimensions of the object 308 are possible as well. The radiation wave 310 may be reflected off the reflective surface 302 to form a reference beam. Similarly, the radiation wave 310 may be reflected off the object 308 to form an object beam.

The image sensor 304 may be positioned so as to receive the reference beam and the object beam and determine an interference pattern between the reference beam and the object beam. To this end, the object 308 may be positioned in between an imaging place of the image sensor 304 and a plane in which the reflective surface 302 lies (e.g., on or near the reflective surface 302). The object beam may be reflected directly towards the image sensor 304, such that the object beam does not pass through any intermediate optical elements. The reference beam and the object beam may jointly form, by wave interference, a holographic image at the imaging place of the image sensor 304. The holographic image may be stored digitally. As shown in FIG. 3, the holographic imaging device 300 allows for reconstruction of the holographic image without use of intermediate optical elements (e.g., a beam-splitting device), thus allowing for a compact design of the holographic imaging device 300.

Figure 4:
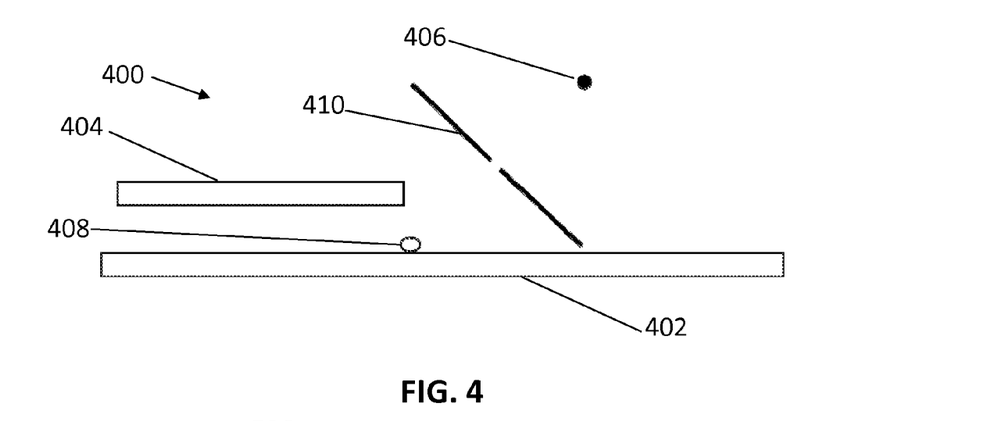
FIG. 4 is a schematic of an example holographic imaging device in which a radiation source comprises an aperture, in accordance with some embodiments.

FIG. 4 is a schematic of an example holographic imaging device 400 in which a radiation source comprises an aperture 410, in accordance with some embodiments. As shown, the holographic imaging device 400 may comprise a reflective surface 402, an image sensor 404, and at least one radiation source 406. The at least one radiation source 406 may comprise at least one aperture 410, as shown. The aperture 410 may be optically coupled to the at least one radiation source 406. The aperture 410 may comprise, for example, a pin-hole collimator and may be positioned, for example, in front of the radiation source 406. Other forms and positions of the aperture 410 are possible as well. The aperture 410 may be configured to impart partial or total coherence to a radiation wave emitted by the radiation source 406. For example, the aperture 410 may impart spatial coherence to the radiation wave when reflected on the reflective surface 402. Other examples are possible as well. By imparting coherence to the radiation wave, the aperture 410 may relax the coherence requirements of the radiation source 406, thereby potentially lowering a cost of the holographic imaging device 400.

Figure 5:
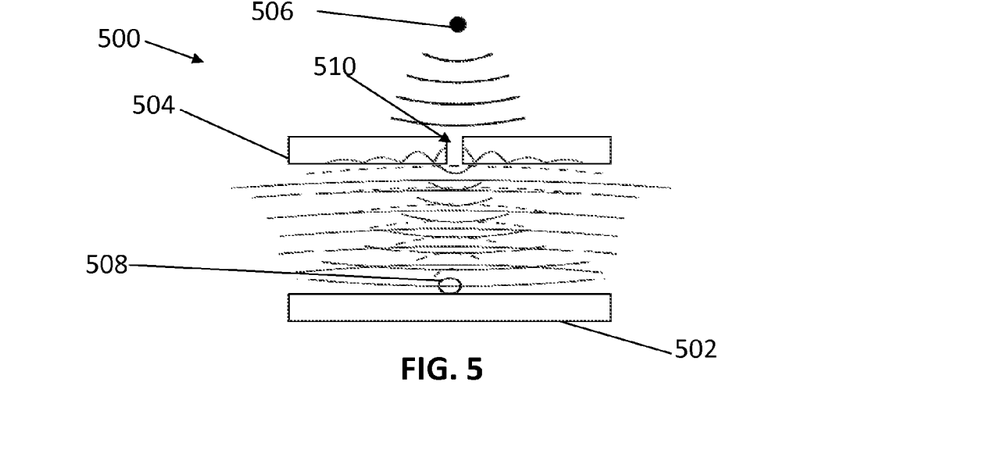
FIG. 5 is a schematic of an example holographic imaging device in which an image sensor comprises an aperture, in accordance with some embodiments.

FIG. 5 is a schematic of an example holographic imaging device 500 in which an image sensor comprises an aperture 510, in accordance with some embodiments. As shown, the holographic imaging device 500 may comprise a reflective surface 502, an image sensor 504, and at least one radiation source 506. The image sensor 504 may comprise at least one aperture 510, as shown. The at least one radiation source 506 may be positioned above the image sensor 504, such that a radiation wave emitted by the radiation source 506 may pass through the aperture 510. The aperture 510 may function as a pin-hole for illuminating an object 508 with spatially coherent radiation, as shown. In some embodiments, the image sensor 504 may be placed near the object 508 and parallel to the reflective surface 502, so as to capture substantially the entire radiation wave diffracted by the object 508.

Figure 6:
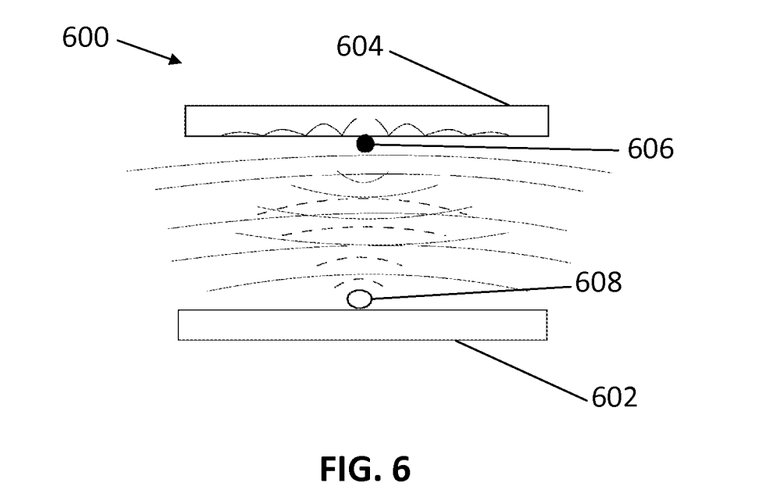
FIG. 6 is a schematic of an example holographic imaging device in which a radiation source is positioned on an image sensor, in accordance with some embodiments.

FIG. 6 is a schematic of an example holographic imaging device 600 in which a radiation source 606 is positioned on an image sensor 604, in accordance with some embodiments. As shown, the holographic imaging device 600 may comprise a reflective surface 602, an image sensor 604, and at least one radiation source 606. As shown, the at least one radiation source 606 is positioned on the image sensor 604. In some embodiments, the at least one radiation source 606 and the image sensor 604 may each be integrated with a semiconductor circuit chip. The at least one radiation source 606 may comprise, for example, an LED or a vertical-cavity surface emitting laser (VCSEL). Other radiation sources 606 are possible as well. The at least one radiation source 606 and the image sensor 604 may be integrated with the semiconductor circuit chip using, for example, multichip module integration or direct-process integration. For example, the image sensor 604 may be processed in GaN technology and the at least one radiation source 606 may comprise one or more LEDs. Other examples are possible as well. In some embodiments, the at least one radiation source 606 may comprise two or more radiation sources 606 formed at one or more predetermined locations on the semiconductor circuit chip. In these embodiments, multiple images of an object 608 may be obtained, each of which corresponds to one of the two or more radiation sources 606. The at least one radiation source 606 and the image sensor 604 may take other forms as well. In some embodiments, the image sensor 604 may comprise an aperture, as described above, and the at least one radiation source 606 may be positioned inside the aperture (e.g., on a wall of the aperture), so as to, for example, improve compactness of the holographic imaging device 600. Further, in some embodiments, the holographic imaging device 600 may be implemented as a single-chip solution (i.e., one which requires no further assembly actions), thereby providing a compact alternative to, for example, a conventional optical microscope. The holographic imaging device 600 may take other forms as well.

In embodiments where the holographic imaging device includes an aperture, the holographic imaging device may further comprise a valve for opening and closing the aperture. The valve may comprise, for example, a MEMS-based optical valve. In embodiments where two or more radiation sources are included, one or more valves may be used to control which radiation sources emit radiation waves towards the reflective surface and the object, thereby allowing reconstruction of a more detailed holographic image representing the object. For example, two or more images may be obtained and used to reconstruct a high resolution and/or multispectral range image representing the object. Other examples are possible as well.

In some embodiments, a high-density array of radiation sources may be provided. The high-density array of radiation sources may be configured to create a programmable wavefront, which may be used to generate a quasi-planar wavefront near the object and/or near the reflective surface, notwithstanding a small distance between the image sensor and the reflective surface. A plurality of phase-synchronized radiation waves may be emitted through the use of, for example, a "path-match" optical waveguide delivery of a single radiation wave through a plurality of apertures. The phase-synchronized radiation waves may be emitted in other manners as well.

Figure 7:
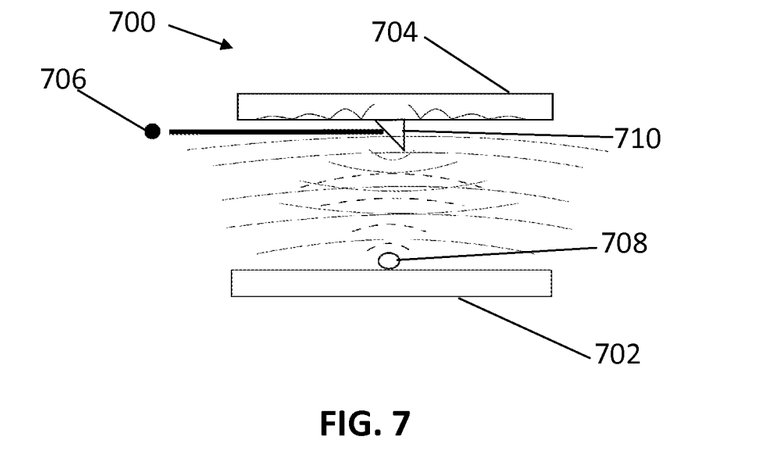
FIG. 7 is a schematic of an example holographic imaging device comprising an external radiation source, in accordance with some embodiments.

FIG. 7 is a schematic of an example holographic imaging device 700 comprising an external radiation source 706, in accordance with some embodiments. As shown, the holographic imaging device 700 may comprise a reflective surface 702, an image sensor 704, and an external radiation source 706 (e.g., an at least partially coherent external radiation source). The holographic imaging device 700 may additionally comprise a MEMS device 710 configured to reflect a radiation wave emitted by the external radiation source 706 onto an object 708 and the reflective surface 702. To this end, the MEMS device 710 may be positioned between the reflective surface 702 and the image sensor 704, as shown, or may be positioned on the image sensor 704 (e.g., on a surface of the image sensor 704 facing the reflective surface 702).

The radiation wave may be emitted by the external radiation source 706, which may have high coherency and/or low speckle. Because the external radiation source 706 is external to the holographic imaging device 700, it may not affect compactness of the holographic imaging device 700. The external radiation source 706 may comprise, for example, a laser device. Other external radiation sources are possible as well.

In some embodiments, the holographic imaging device may further comprise an actuating means configured to move the image sensor relative to the object and/or relative to the radiation source, thereby allowing the holographic imaging device to obtain multiple holographic images of the object from different viewpoints. The multiple holographic images may be used to generate a more detailed analysis of the object and a higher resolution and/or multispectral range holographic image. For a single light source comprising a plurality of pixels, the actuating means may comprise a sub-pixel moving means, allowing movement of the image sensor at a sub-pixel level. For example, nine images may be acquired with sub-pixel shifts to form a 3×3 grid, which may result in a threefold increase in resolution of the final reconstructed image compared to a single image acquisition. Other examples are possible as well.

In some embodiments, the at least one radiation source may comprise an optical waveguide configured to provide a localized light emission point. The optical waveguide may, for example, comprise an optical fiber and may, for example, be positioned on top of the image sensor. Alternatively or additionally, the optical waveguide may, for example, end in between the image sensor and the reflective surface, so as to direct light towards the reflective surface. In some embodiments, the at least one radiation source may comprise a plurality of optical waveguides positioned on the image sensor. In these embodiments, each of the optical waveguides may be controlled individually so as to illuminate the object from different viewpoints, thereby allowing for obtaining multiple holographic images and, in turn, a higher resolution and/or multispectral range holographic image, as described above. Radiation may be supplied to the optical waveguide(s) by an external radiation source, as described above. In some embodiments, the radiation may be fully contained within the optical waveguide, thereby avoiding scattering of the radiation. In some embodiments, radiation from a single external radiation source may be split into multiple optical waveguides. In some embodiments, the external radiation source may be tunable (e.g., may be a tunable laser) to provide different wavelengths of radiation. Alternatively, in some embodiments, a filter may be used to tune the wavelength of the radiation source to a specific wavelength (e.g., to improve the spectral coherence of the emitted radiation).

In some embodiments, the radiation source may comprise a plurality of radiation sources, each of which emits radiation of a different wavelength. For example, each of the radiation sources may comprise a monochromatic light source configured to emit monochromatic light of a predetermined wavelength. A holographic image may be obtained using each wavelength, and the multiple holographic images may be used to generate a higher resolution and/or multispectral range holographic image, as described above. Such obtaining of multiple images may be valuable when, for example, the object comprises materials having varying light absorption and/or scattering properties (e.g., when the object comprises a biological sample in which cells and/or organelles have varying light absorption and/or scattering properties).

In some embodiments, a multispectral image sensor may be used in combination with a radiation source for illuminating the object with multiple wavelengths, so as to enable multispectral imaging. A holographic image may be captured by multiple sequential captures, thereby improving a resolution of a resulting holographic image. The improved resolution may allow for, for example, distinguishing between living and dead cells (e.g., as applicable in the biopharmaceutical industry). Other examples are possible as well.

In some embodiments, the holographic imaging device may further comprise a processor or processing means for reconstructing an image representation of the object. For example, the processor or processing means may be configured to generate a holographic image representing the object based on the determined interference pattern of the reference beam and the object beam. The generation (reconstruction) of the holographic image may be achieved using, for example, standard algorithms such as Fresnel approximation, convolution approximation, and/or angular spectrum approximation algorithms.

In some embodiments, it may not be necessary for a distance and inclination between the image sensor and the object to be controlled or determined. In some embodiments, software algorithms (e.g., implemented on the processor or processing means) may compensate for mechanical inaccuracies or uncertainties (e.g., x-y-z alignment coordinates and exact offset and/or distance measurements, and the xy-xz-yz rotational alignments). These may be compensated for in software by, for example, sweeping across multiple depths to find the exact reconstruction distance. The nature of the holographic reconstruction algorithm enables this, as the recorded image basically contains information from all the depths, i.e., from the whole imaged volume. The inaccuracies or uncertainties may be compensated for in other manners as well.

Figure 8:
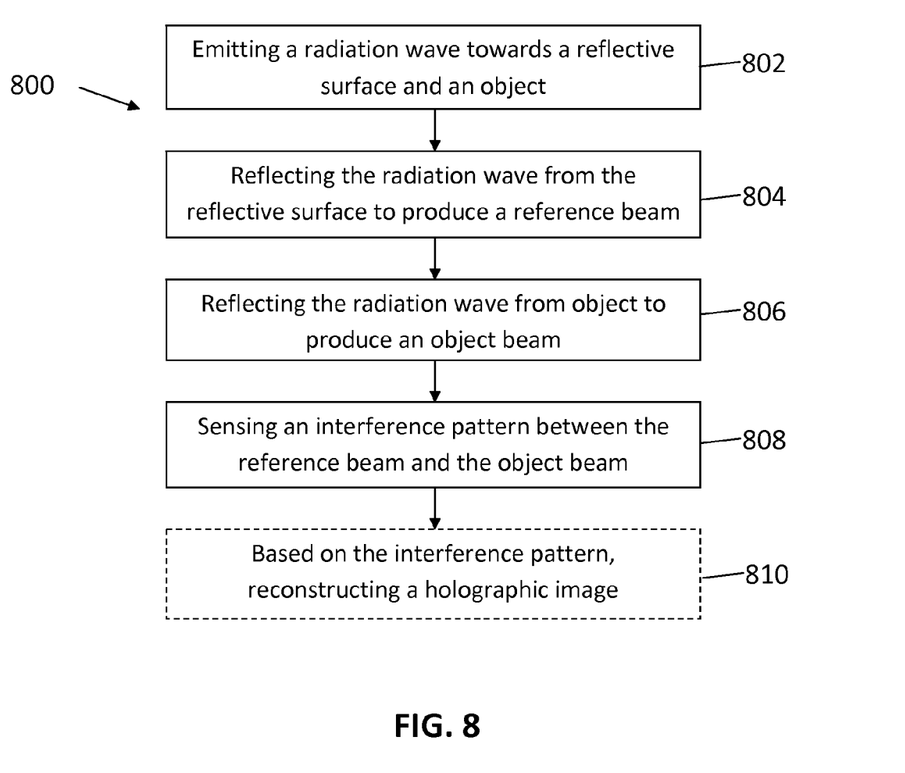
FIG. 8 is a flowchart illustrating an example method of obtaining a holographic image representing an object, in accordance with some embodiments.

FIG. 8 is a flowchart illustrating an example method 800 of obtaining a holographic image representing an object, in accordance with some embodiments. The method 800 may be carried out by, for example, a holographic imaging device, such as any of the holographic imaging devices shown above. As shown, the method 800 begins at block 802 with emitting a radiation wave towards a reflective surface and an object. The radiation wave may be, for example, an at least partially coherent radiation wave. The radiation wave may be emitted by one radiation source or by multiple radiation sources. The radiation source may be included in the holographic imaging device or may be external to the holographic imaging device. The radiation source may comprise, for example, an LED or a laser. The radiation source may comprise an aperture. The object may, for example, be positioned on or near the reflective surface and/or in a micro-fluidic channel transported by a flow through a region illuminated by the emitted radiation wave, as described above.

At block 804, the radiation wave may be reflected by the reflective surface to produce a reference beam. The reference beam may be reflected towards an image sensor without the use of any intermediate optical elements.

Similarly, at block 806, the radiation wave may be reflected by the object to produce an object beam. The object beam may be reflected towards the image sensor without the use of any intermediate optical elements.

The method 800 continues at block 808 where an interference pattern between the reference wave and the object wave may be sensed. The interference pattern may be sensed by, for example, the image sensor.

At block 810, a holographic image representing the object may be reconstructed based on the interference pattern. The reconstructing may be performed by a processor or processing means included in and/or communicatively coupled to the holographic imaging device.

In some embodiments, blocks 802-806 may involve emitting and reflecting multiple radiation waves (e.g., of differing wavelengths and/or emitted from different radiation sources) and block 808 may involve sensing multiple interference patterns. In these embodiments, a holographic image representing the object may be reconstructed from each interference pattern and/or a higher resolution or multispectral range holographic image representing the object may be reconstructed.

In some embodiments, the method may further comprise opening or closing one or more apertures included in the image sensor so as to illuminate the object from different viewpoints. In these embodiments, multiple interference patterns may be sensed, as described above. Further, a holographic image may be reconstructed from each interference pattern and/or a higher resolution or multispectral range holographic image may be reconstructed.

In some embodiments, the holographic image(s) may be post-processed to improve a resolution of the holographic image(s).

The method may include additional steps as well.

The invention claimed is:

1. A holographic imaging device comprising:
   at least one radiation source;
   a reflective surface; and
   an image sensor, wherein:
   (a) the at least one radiation source is configured to emit a radiation wave towards the reflective surface and an object positioned on or near the reflective surface, wherein the radiation wave is reflected by the reflective surface to produce a reference wave and is reflected directly toward the image sensor by the object without passing through any intermediate optical devices to produce an object wave directed at the image sensor, and
   (b) the image sensor is configured to determine an interference pattern between the reference wave and the object wave.

2. The holographic imaging device of claim 1, wherein the reflective surface is substantially parallel to the image sensor.

3. The holographic imaging device of claim 1, wherein the at least one radiation source is positioned between the reflective surface and the image sensor.

4. The holographic imaging device of claim 1, wherein the at least one radiation source is positioned on the image sensor.

5. The holographic imaging device of claim 1, wherein the image sensor comprises at least one aperture.

6. The holographic imaging device of claim 5, wherein the at least one radiation source is located within the at least one aperture.

7. The holographic imaging device of claim 5, wherein the aperture is holographically coupled to the at least one radiation source and configured to impart spatial coherence to the radiation wave.

8. The holographic imaging device of claim 5, further comprising a valve configured to open and close the at least one aperture.

9. The holographic imaging device of claim 1, wherein the at least one radiation source comprises a microelectromechanical system device.

10. The holographic imaging device of claim 1, wherein the at least one radiation source comprises at least one of an optical waveguide, a light-emitting diode, or a laser.

11. The holographic imaging device of claim 1, wherein the at least one radiation source comprises a plurality of radiation sources.

12. The holographic imaging device of claim 11, wherein each radiation source in the plurality of radiation sources is configured to emit radiation of a different wavelength.

13. The holographic imaging device of claim 1, further comprising an actuator configured to move the image sensor relative to at least one of the object and the at least one radiation source.

14. The holographic imaging device of claim 1, wherein the holographic imaging device further comprises or is communicatively coupled to at least one processor configured to, based on the interference pattern, reconstruct a holographic image representing the object.

15. A method comprising:
providing a holographic imaging device comprising at least one radiation source, a reflective surface, and an image sensor;
the at least one radiation source emitting a radiation wave towards the reflective surface, wherein the radiation wave is (i) reflected by the reflective surface to produce a reference wave and (ii) reflected by an object in the holographic imaging device directly toward the image sensor without passing through any intermediate optical device to produce an object wave directed at the image sensor; and
determining an interference pattern between the reference wave and the object wave.

16. The method of claim 15, further comprising, based on the interference pattern, reconstructing a holographic image representing the image.

17. A method comprising:
providing a holographic imaging device comprising at least one radiation source, a reflective surface, and an image sensor;
the at least one radiation source emitting a first radiation wave, wherein the first radiation wave is (i) reflected by the reflective surface to produce a first reference wave and (ii) reflected by an object in the holographic imaging device directly toward the image sensor without passing through any intermediate optical device to produce a first object wave directed at the image sensor;
the at least one radiation source emitting a second radiation wave, wherein the second radiation wave is (i) reflected by the reflective surface to produce a second reference wave and (ii) reflected by the object in the holographic imaging device directly toward the image sensor without passing through any intermediate optical device to produce a second object wave directed at the image sensor;
determining a first interference pattern between the first radiation wave and the first object wave;
determining a second interference pattern between the second reference wave and the second object wave; and
based on the first interference pattern and the second interference pattern, reconstructing a holographic image representing the object.

18. The method of claim 17, wherein the first radiation wave has a first wavelength and the second radiation wave has a second wavelength different than the first wavelength.

19. The method of claim 17, further comprising, prior to the at least one radiation source emitting the second radiation wave, at least one of (i) a valve closing an aperture on the image sensor and (ii) an actuator moving the image sensor relative to the object and the at least one radiation source.

* * * * *